(12) United States Patent
Koch et al.

(10) Patent No.: US 10,322,666 B2
(45) Date of Patent: Jun. 18, 2019

(54) MOTOR VEHICLE

(71) Applicant: Bayerische Motoren Werke Aktiengesellschaft, Munich (DE)

(72) Inventors: Andre Koch, Munich (DE); Stefan Mieslinger, Landshut (DE); Martin Kerscher, Dornwang (DE); Frank Geiger, Thierhaupten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/844,772

(22) Filed: Dec. 18, 2017

(65) Prior Publication Data

US 2018/0105098 A1    Apr. 19, 2018

Related U.S. Application Data

(63) Continuation of application No. PCT/EP2016/063675, filed on Jun. 15, 2016.

(30) Foreign Application Priority Data

Jun. 19, 2015   (DE) .................. 10 2015 211 341

(51) Int. Cl.
*B62D 25/08*    (2006.01)
*B60Q 1/26*    (2006.01)
(Continued)

(52) U.S. Cl.
CPC ............. *B60Q 1/2653* (2013.01); *B60Q 1/26* (2013.01); *B60Q 1/2623* (2013.01);
(Continued)

(58) Field of Classification Search
CPC ...... B60Q 1/2653; B60Q 1/26; B60Q 1/2623; B60Q 1/2638; B60Q 1/30; B62D 25/08; B62D 25/24
(Continued)

(56) References Cited

U.S. PATENT DOCUMENTS

| 2,286,448 A | 6/1942 | Wahlberg |
| 5,394,311 A | 2/1995 | Asano |

(Continued)

FOREIGN PATENT DOCUMENTS

| DE | 91 12 853 U1 | 2/1992 |
| DE | 198 34 686 A1 | 2/2000 |

(Continued)

OTHER PUBLICATIONS

German-language Search Report issued in counterpart German Application No. 10 2015 211 341.8 dated Jan. 25, 2016 with partial English translation (13 pages).

(Continued)

*Primary Examiner* — Joseph D. Pape
(74) *Attorney, Agent, or Firm* — Crowell & Moring LLP

(57) ABSTRACT

A motor vehicle has a body, wherein the body has body openings, in which auxiliary devices such as lamps, turn indicators, or the like are arranged. A body wall surrounds the body opening and has a body flange formed at the particular body opening, to which body wall a cup-shaped insert is fastened, wherein the particular auxiliary device is fastened to the cup-shaped insert. The cup-shaped insert has a peripheral or partially peripheral, bent flange segment having a fastening segment, which extends parallel to an inner surface of the body wall surrounding the body opening. A glue or an adhesive layer is applied between the outer surface of the fastening segment of the flange segment of the cup-shaped insert and the inner surface of the body wall. A seal is arranged in an intermediate space between a flange segment of the cup-shaped insert and the body wall.

9 Claims, 3 Drawing Sheets

(51) Int. Cl.
*B62D 25/24* (2006.01)
*B60Q 1/30* (2006.01)

(52) U.S. Cl.
CPC ............ *B60Q 1/2638* (2013.01); *B60Q 1/30* (2013.01); *B62D 25/08* (2013.01); *B62D 25/24* (2013.01)

(58) Field of Classification Search
USPC ..................... 296/193.09, 193.08; 362/548
See application file for complete search history.

(56) References Cited

U.S. PATENT DOCUMENTS

| | | | |
|---|---|---|---|
| 6,247,831 B1* | 6/2001 | Sugiyama | B60Q 1/0433 362/267 |
| 2005/0249936 A1 | 11/2005 | Ui et al. | |
| 2006/0045977 A1 | 3/2006 | List | |
| 2009/0085302 A1 | 4/2009 | Helfert et al. | |
| 2009/0294196 A1 | 12/2009 | Stahl | |
| 2013/0229821 A1* | 9/2013 | Okada | B60Q 1/2653 362/548 |

FOREIGN PATENT DOCUMENTS

| | | |
|---|---|---|
| DE | 103 03 366 A1 | 8/2004 |
| DE | 10 2004 042 852 A1 | 3/2006 |
| DE | 60 2005 004 197 T2 | 1/2009 |
| DE | 10 2008 026 502 A1 | 12/2009 |
| EP | 2 786 919 A1 | 10/2014 |
| JP | 2001-114145 A | 4/2001 |
| WO | WO 2004/044271 A1 | 5/2004 |

OTHER PUBLICATIONS

International Search Report (PCT/ISA/210) issued in PCT Application No. PCT/EP2016/063675 dated Aug. 29, 2016 with English translation (8 pages).

German-language Written Opinion (PCT/ISA/237) issued in PCT Application No. PCT/EP2016/063675 dated Aug. 29, 2016 (6 pages).

* cited by examiner

MOTOR VEHICLE

CROSS REFERENCE TO RELATED APPLICATIONS

This application is a continuation of PCT International Application No. PCT/EP2016/063675, filed Jun. 15, 2016, which claims priority under 35 U.S.C. § 119 from German Patent Application No. 10 2015 211 341.8, filed Jun. 19, 2015, the entire disclosures of which are herein expressly incorporated by reference.

BACKGROUND AND SUMMARY OF THE INVENTION

The invention relates to a motor vehicle with a body, wherein the body has body openings in which auxiliary devices, such as lamps, direction indicators or the like are arranged. A body wall is formed at the respective body opening. The body wall surrounding the body opening has a body flange and to which body wall a cup shaped insert is fastened, wherein the respective auxiliary device is fastened to the cup shaped insert.

DE 19834686 A1 discloses rear lighting arranged in a body opening of a motor vehicle. The body opening has an encircling flange pointing toward the vehicle interior. The flange points, for example, toward the interior of a trunk compartment. The flange bounds a receiving opening for a reflector housing of the rear lighting. Welded to an opposite outer surface of the body flange is an inner surface of a flange of a cup-shaped housing. A portion, angled with respect thereto, of the welded-on housing flange is sealed in relation to a body wall via a seal. In order to fasten the housing flange of the cup-shaped housing, the body flange lying opposite the latter has a length of several centimeters.

For the design of rear lamps which have, for example, an oval portion, a complicated geometry of the body flange serving for the fastening is required in order, for example, to avoid cracks during the production of the flanges. If the fastening of a cup-shaped housing to said body flange takes place via a welded connection, further measures are required in order to provide welding lugs of a sufficient size.

It is the object of the invention to provide a motor vehicle in which the fastening of cup-shaped housings in body openings is simplified and the cup-shaped housings have narrow radii for design reasons.

This and other objects are achieved by a motor vehicle according to the invention which has a body with body openings, wherein auxiliary devices, such as lamps, direction indicators or the like, are arranged in the body openings. A body wall is formed at the respective body opening, said body wall surrounding the body opening, having a body flange and to which body wall a cup-shaped insert is fastened. The respective auxiliary device is fastened to the cup-shaped insert.

A peripheral or partially peripheral, angled flange portion is advantageously formed on the cup-shaped insert and has a fastening portion which runs parallel to an inner surface of the body wall surrounding the body opening. An adhesive or an adhesive layer is applied between the outer surface of the fastening portion of the flange portion of the cup-shaped insert and the inner surface of the body wall. A seal is arranged in an intermediate space between a flange portion of the cup-shaped insert and the body wall.

In an advantageous embodiment, a body flange portion bounding the body opening has a constant width or a constant length $l_{s1}$.

The length $l_{s1}$ of the body flange portion bounding the body opening advantageously lies within a range of 0.5 cm $\leq l_{s1} \leq$ 1.5 cm.

In an advantageous embodiment, the fastening portion of the flange portion of the cup-shaped insert is integrally adjoined by an angled flange portion.

An expandable seal is arranged in the intermediate space between the outer surface of the angled flange portion of the cup-shaped insert and the inner surface of the body wall.

The seal is advantageously composed of a material which expands from a predetermined temperature T and sealingly fills the intermediate space.

In an advantageous manner, the predetermined temperature T lies at 140° C. $\leq$ T $\leq$ 220° C.

The cup-shaped insert is advantageously of single-part or multi-part construction.

In an advantageous embodiment, the auxiliary device arranged in the cup-shaped insert is a rear lamp.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
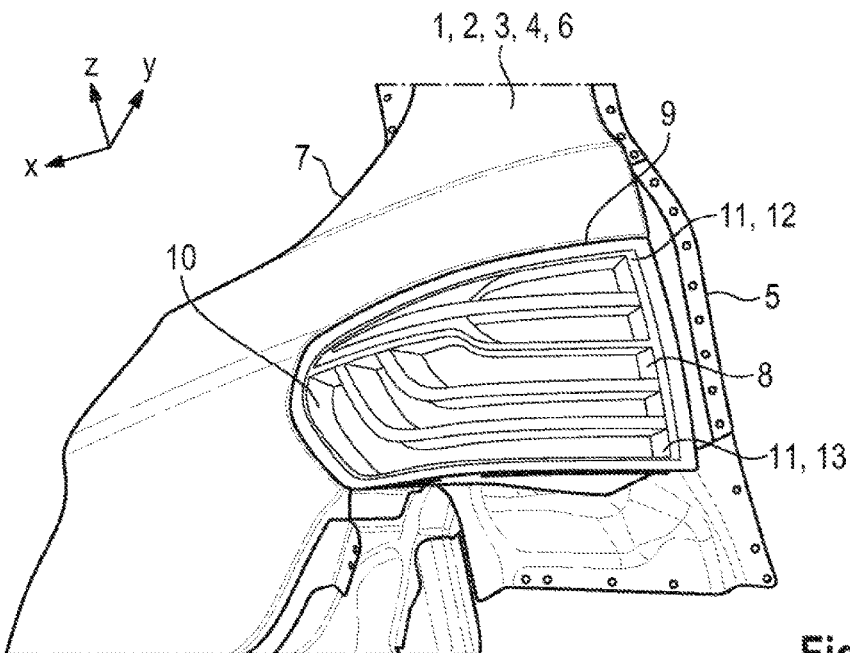
FIG. 1 is a perspective partial view of a side of a vehicle rear, in which a rear lamp is arranged.

FIG. 1 shows a rear region 2 of a body 3 of a motor vehicle 1 below a C-body pillar 4 of the motor vehicle 1 with a notchback in the region of an opening 5 of a trunk compartment or loading compartment of the motor vehicle 1.

In another embodiment, the region shown relates to the rear region 2 of a body 3 below a D-body pillar 4 of a motor vehicle 1 with a hatchback in the region of a trunk compartment opening 5 of the motor vehicle 1. The trunk compartment opening 5 is closable by a trunk compartment lid (not illustrated) or a tailgate (not illustrated).

The body pillar 4, i.e., the C or D-pillar, is formed on a side wall 6 of the body 3. Below a lower end 7 of the body pillar 4, a body opening 9 which is adapted to the shape of a rear lamp 8 is formed in the side wall 6.

The rear lamp 8 (and therefore correspondingly the body opening 9) has a rounded portion 10 (body flange portion 15) pointing forward in the longitudinal direction x of the vehicle in top view, which portion is adjoined by a portion 11 (body flange portion 16) with two opposite corners 12 and 13.

Figure 2:
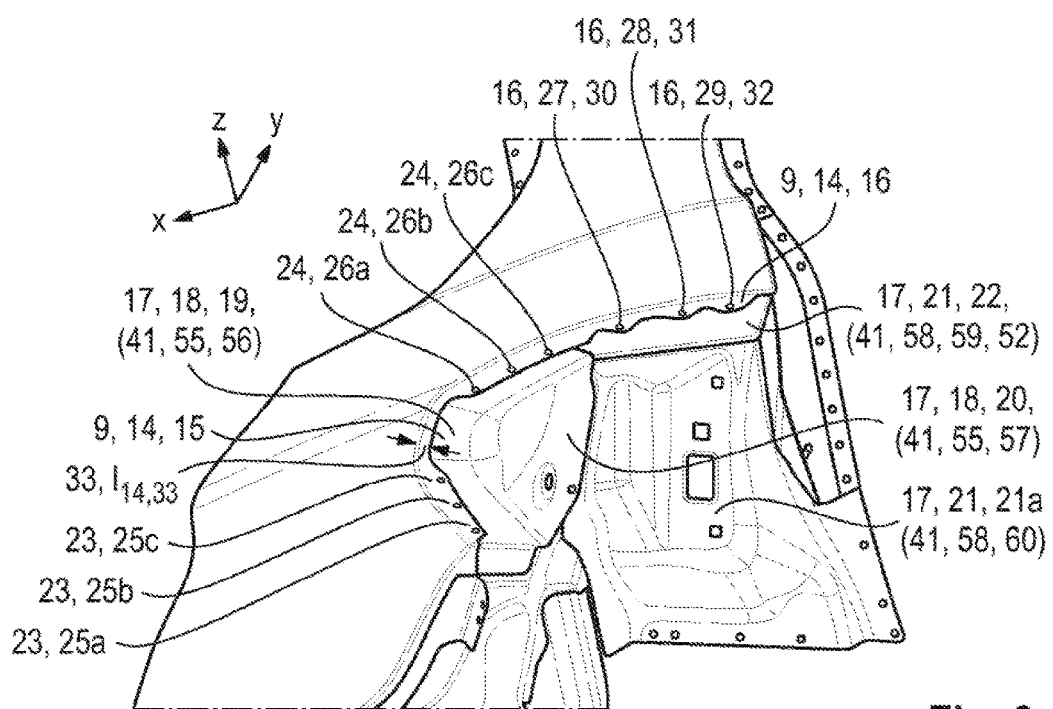
FIG. 2 is a perspective illustration corresponding to FIG. 1, wherein the rear lamp has been removed, and therefore the fastening of a known embodiment of a rear lamp cup in a body opening to a body flange in a known manner is visible.

The shape of the body opening 9 with a body flange 14 arranged thereon can be seen in FIG. 2. The body flange 14 has a rounded body flange portion 15 which is adjoined by a body flange portion 16 which has an approximately rectilinear profile with a slight curvature.

The shape of the flange 14 with its flange portions 15, 16 corresponds to the shape of the rear lamp 8 with respect to the rounded portion 10 thereof and the approximately square portion 11 thereof, as seen from above in the top view. A known embodiment of a rear lamp cup 17 is fastened via the flange 14.

In the embodiment shown, the rear lamp cup 17 consists of a front sheet-metal portion 18, as seen in the longitudinal direction x of the vehicle, which, as viewed from above in the top view, has a flange 19 with a V-shaped profile.

The V-shaped flange 19 is adjoined by a base portion 20. The sheet-metal portion 18 is adjoined by a rear sheet-metal portion 21. The rear sheet-metal portion 21 has a flange 22 pointing to the rectilinear flange portion 16 of the body flange 14, and a rear base portion 21a.

As emerges from FIG. 2, the rounded body flange portion 15 has two extended fastening portions 23 and 24 on which in each case three fastening points 25a, 25b, 25c and 26a, 26b and 26c are formed. In one embodiment, the fastening points 25, 26 are, for example, welding points.

Three fastening flanges 27, 28, 29 are formed on the body flange portion 16 with the approximately rectilinear profile. The fastening flanges 27, 28, 29 each have a fastening point 30, 31, 32 via which the flange 22 of the rear sheet-metal portion 21 is fastened to the body flange 14. The fastening points 30, 31, 32 are, for example, welding points.

It can furthermore be seen from FIG. 2 that the rounded body flange portion 15 of the body flange 14 has a narrow flange portion 33 with a width or length $l_{14, 33}$. The narrow flange portion 33 of the rounded flange portion 15 is required in order to avoid cracking and/or creasing of the rounded body flange portion 15.

Figure 3:
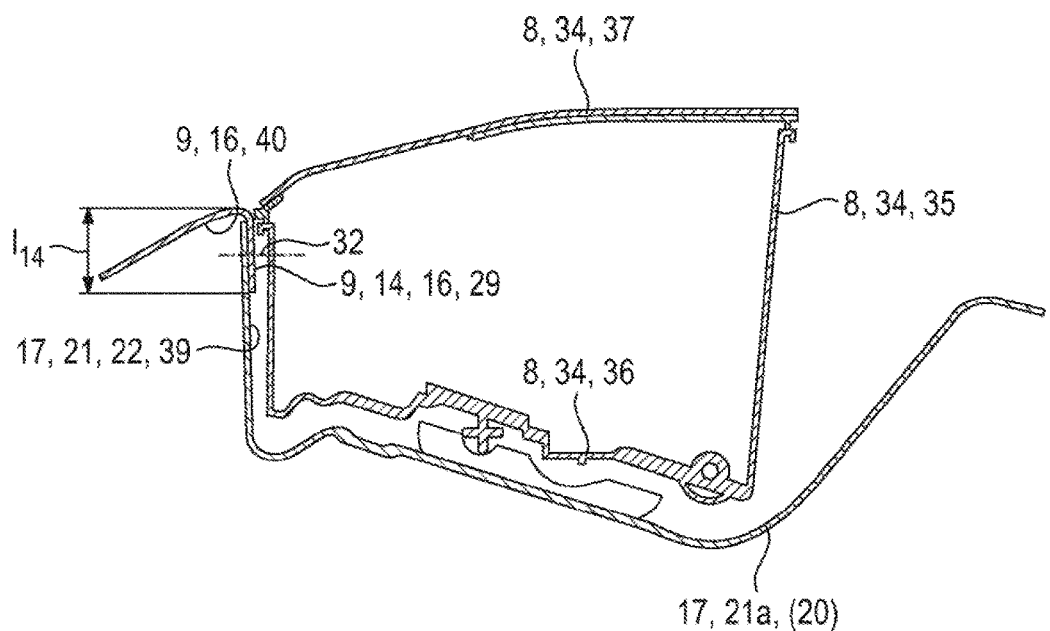
FIG. 3 is a sectional view of FIG. 1, which shows a known fastening of the rear lamp cup to an encircling body flange.

FIG. 3 shows a sectional view of the rear lamp 8 and of the known rear lamp cup 17 through the fastening flange 29 of the flange portion 16 on the body opening 9 in FIG. 1. The rear lamp 8 has a housing 34 with encircling side walls 35 and a base 36 connected thereto. The housing 34 of the rear lamp 8 is closed by a covering 37.

The covering 37 can have transparent portions, for example for the reversing light, and colored portions, for example for the taillight and the brake lamp. The base 36 of the housing 34 of the rear lamp 8 is fastened to the base 20, 21a of the rear lamp cup 17 via suitable fasteners (not illustrated).

FIG. 3 illustrates a fastening point 32 on a fastening flange 29 of the flange portion 16 at the body opening 9. The flange 22 of the rear sheet-metal portion 21 of the rear lamp cup 17 is fastened in a known manner by an outer surface 39 of the flange 22, which outer surface points to the fastening flange 29, being arranged on an outer surface 40, lying opposite thereto, of the flange portion 16 with the rectilinear profile, for example by means of welding.

A width or length 1 of the known flange 14 of the body opening 9 lies within a range of $l_{14minimum}$, i.e. 2 cm$\leq l_{14maximum} \leq$3 cm, for example on the rounded body flange portion 15 at the height of the two extended fastening portions 23 and 24 up to $l_{14,minimum}$, i.e. 1.5 cm$\leq l_{14minimum}$ ($l_{14, 33}$)$\leq$2 cm, for example on the narrow flange portion 33.

Figure 4:
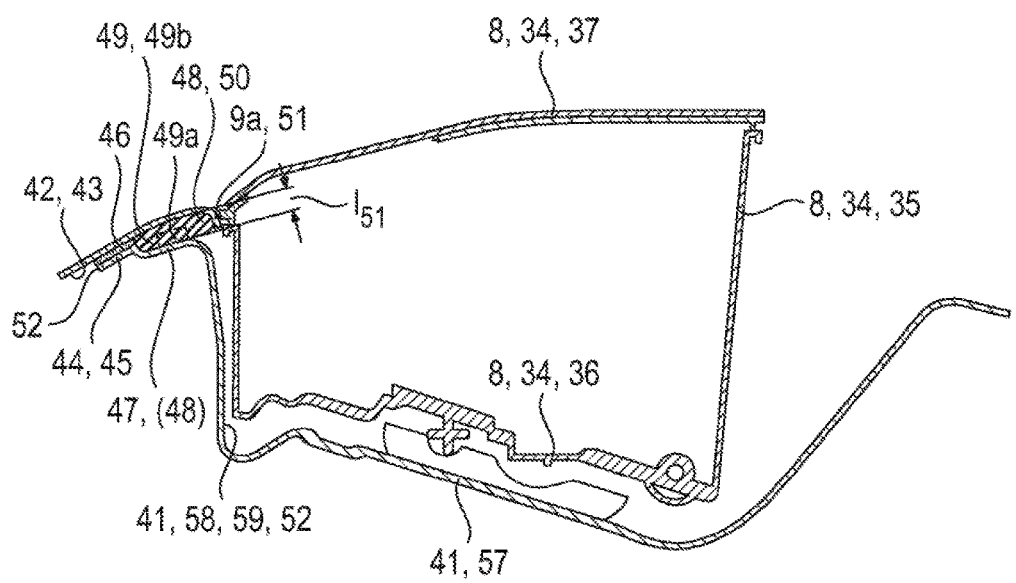
FIG. 4 is a sectional illustration as in FIG. 3, which shows a fastening according of an embodiment of the invention of a rear lamp cup to an inner wall of the body at a distance from a shortened body flange, wherein the rear lamp cup is fixed in its designated geometrical position by adhesive bonding.

FIG. 4 substantially corresponds to FIG. 3 with respect to the rear lamp 8, i.e. the same components of the rear lamp 8 as in FIG. 3 are provided with the same reference signs.

FIG. 4 shows a sectional view of an arrangement according to the invention of a rear lamp cup 41 on an inner surface 42 of a body wall 43. For this purpose, the rear lamp cup 41 has an angled, encircling flange portion 44 which runs approximately parallel to the inner surface 42 of the body wall 43.

An adhesive layer or an adhesive 46 is applied to a fastening portion 45 of the flange portion 44, the adhesive adhesively bonding the fastening portion 45 of the flange portion 44 of the rear lamp cup 41 to the inner surface 42 of the body wall 43.

This adhesive bond serves to fix the rear lamp cup 41 in its designated position or geometrical position. The fastening portion 45 is adjoined by an angled flange portion 47 on which a seal 48 is arranged.

In the embodiment shown, the seal 48 is composed of a sealing material 49 in bead form, the sealing material being in the unexpanded basic state 49a during application. In the embodiment shown, the seal 48 is illustrated as a bead in the nonexpanded state 49a by dashed lines.

At high temperatures of 140° C.$\leq$T$\leq$220° C., which occur, for example, during the painting operation, the seal 48 expands and, in the expanded state 49b, sealingly fills an intermediate space 50 between the body wall 43 and the rear lamp cup 41.

The cavity or intermediate space 50 is formed between the inner surface 42 of the body wall 43, which has a rectilinear and flat profile in the sectional view of FIG. 4, an adjoining body flange portion 51 and the outer surface 52 of the flange portion 47 of the rear lamp cup 41.

Figure 5:
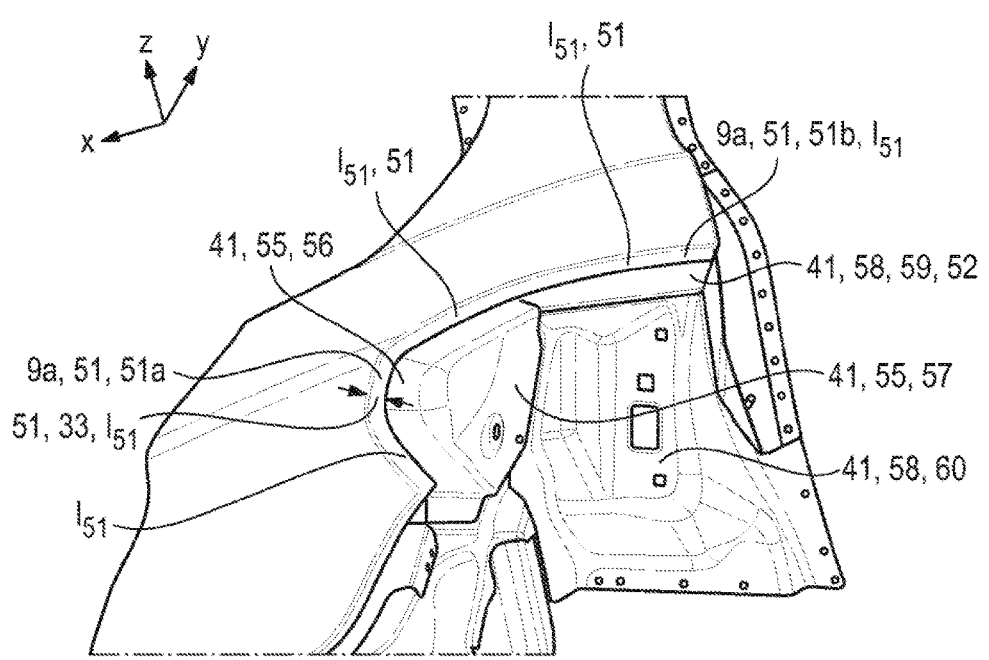
FIG. 5 is a perspective illustration as in FIG. 2, wherein the rear lamp has been removed, and therefore the fastening of an embodiment according to the invention of a rear lamp cup in a body opening to a body flange is visible.

The rear lamp cup 41 illustrated in FIGS. 4 and 5 has the same shape as the rear lamp cup 17 shown in FIG. 2. In a corresponding manner, the rear lamp cup 41 consists of a front sheet-metal portion (18), 55, as seen in the longitudinal direction x of the vehicle, which has, as viewed from above in top view, a flange (19), 56 with a V-shaped profile.

The V-shaped flange (19), 56 is adjoined by a base portion (20), 57. The front sheet-metal portion (18), 55 is adjoined by a rear sheet-metal portion (21), 58. The rear sheet-metal portion (21), 58 has a flange (22), 59 which corresponds to the flange 22 and has an outer surface 52, and a base portion 60 (21a).

Like the body flange 14 of FIG. 2, the body flange portion 51 at the body opening 9a of FIG. 5 has a rounded portion 51a which is adjoined by a portion 51b which has an approximately rectilinear profile and a slight curvature.

In contrast to the body flange 14 of FIG. 2 with its different lengths lying within a range of 1.5 cm$\leq l_{14}\leq$3 cm, the body flange portion 51 according to the invention has an approximately constant length $l_{51}$ which lies at 1 cm$\leq l_{51}\leq$1.5 cm. The body flange portion 51 can therefore be produced in a simple manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
a body having a body opening configured for an auxiliary device, wherein a body wall surrounding the body opening and having a body flange is formed at the body opening;
a cup-shaped insert fastened to the body wall, wherein the auxiliary device is fastenable to the cup-shaped insert, wherein the cup-shaped insert has a peripheral or partially peripheral, angled flange portion with a fastening portion extending parallel to an inner surface of the body wall surrounding the body opening,
an adhesive or an adhesive layer applied between an outer surface of the fastening portion of the angled flange portion of the cup-shaped insert and the inner surface of the body wall, and
a seal arranged in an intermediate space between a further flange portion of the cup-shaped insert and the body wall.

2. The motor vehicle as claimed in claim 1, wherein a portion of the body flange bounding the body opening has a constant width or a constant length.

3. The motor vehicle as claimed in claim 2, wherein the length of the portion of the body flange bounding the body opening lies within a range of 0.5 cm≤l≤1.5 cm.

4. The motor vehicle as claimed in claim 1, wherein the further flange portion integrally adjoins the fastening portion of the angled flange portion of the cup-shaped insert.

5. The motor vehicle as claimed in claim 1, wherein the seal is expandable and is arranged in the intermediate space between the outer surface of the further flange portion of the cup shaped insert and the inner surface of the body wall.

6. The motor vehicle as claimed in claim 5, wherein the seal is composed of a material which expands from a predetermined temperature T and sealingly fills the intermediate space.

7. The motor vehicle as claimed in claim 6, wherein the predetermined temperature T lies within a range of 140° C.≤T≤220° C.

8. The motor vehicle as claimed in claim 1, wherein the cup-shaped insert is of single part or multi-part construction.

9. The motor vehicle as claimed in claim 1, wherein the auxiliary device is arranged in the cup-shaped insert and is a rear lamp.

* * * * *